US007659832B2

(12) United States Patent
Kussel

(10) Patent No.: US 7,659,832 B2
(45) Date of Patent: Feb. 9, 2010

(54) ELECTRICALLY CONTROLLED ACTUATING ELEMENT ON A MACHINE

(75) Inventor: Willi Kussel, Werne (DE)

(73) Assignee: Tiefenbach Control Systems GmbH, Essen (DE)

( * ) Notice: Subject to any disclaimer, the term of this patent is extended or adjusted under 35 U.S.C. 154(b) by 840 days.

(21) Appl. No.: 11/243,384

(22) Filed: Oct. 4, 2005

(65) Prior Publication Data

US 2006/0027263 A1 Feb. 9, 2006

Related U.S. Application Data

(63) Continuation of application No. PCT/DE2004/000676, filed on Apr. 1, 2004.

(30) Foreign Application Priority Data

Apr. 4, 2003 (DE) ................................ 103 15 752

(51) Int. Cl.
*F16K 17/40* (2006.01)

(52) U.S. Cl. .............................. 340/825.62; 137/68.16; 340/825.6; 200/50.02

(58) Field of Classification Search ............ 340/825.62, 340/825.6; 137/68.16; 200/50.02
See application file for complete search history.

(56) References Cited

U.S. PATENT DOCUMENTS 4,174,517 A * 11/1979 Mandel ................. 340/310.12
4,628,162 A * 12/1986 Reinartz et al. ........... 200/84 C
6,053,198 A 4/2000 Atkin et al.
7,074,211 B1 * 7/2006 Heiniger et al. ............. 604/198

FOREIGN PATENT DOCUMENTS

| | | |
|---|---|---|
| CN | 2188221 Y | 1/1995 |
| DE | 29604125 | 5/1996 |
| DE | 19840597 | 3/2000 |
| EP | 0487173 | 5/1992 |
| EP | 1229451 | 8/2002 |
| WO | WO 01/36085 | 5/2001 |
| WO | WO 02/065221 | 8/2002 |

* cited by examiner

*Primary Examiner*—Brian A Zimmerman
*Assistant Examiner*—Yong Hang Jiang
(74) *Attorney, Agent, or Firm*—Alston & Bird LLP

(57) ABSTRACT

An electrically controlled actuating element is arranged on a machine by a flange connection consisting of a mounting flange (4) and a machine flange (2), and is controlled by an electric control subsystem (6). Embedded in the mounting flange (4) in a predetermined geometric pattern is a plurality of electric switches (7.1-7.8, 8.1-8.8). Each switch is arranged in an electric circuit that connects to the control subsystem. In the machine flange (2), closing elements are arranged in some marking points of the geometric pattern in a geometric arrangement that is characteristic of the respective machine and associated to it. In an existing flange connection, the switches located in the respective marking points can be actuated by the closing elements. The control subsystem (6) of each consumer is provided with a memory (11), which stores the geometric arrangement of the closing elements that is characteristic of and associated to the machine.

8 Claims, 1 Drawing Sheet

ELECTRICALLY CONTROLLED ACTUATING ELEMENT ON A MACHINE

CROSS REFERENCE TO RELATED APPLICATION

The present application is a continuation of international application PCT/DE2004/000676, filed 1 Apr. 2004, and which designates the U.S. The disclosure of the referenced application is incorporated herein by reference.

BACKGROUND OF THE INVENTION

The invention relates to an electrically controlled actuating element on a machine.

Actuating elements of this type include, for example, hydraulic, electrohydraulic, or pneumatic valves, electromagnets, or actuators. Machines that are actuated by valves include, for example, cylinder-piston units or motors.

A control subsystem is considered, for example, a subordinate control system of a central control system, which is associated to the machine, in particular a magnetic control in the case of magnetically actuated valves.

Actuating elements of this type are often used in larger numbers for purposes of activating a corresponding number of machines. For example, in longwall mining for working the longwall face, it is common to use face supports which comprise a plurality of identical hydraulic cylinder-piston units that actuate the face support units for performing their functions, in particular robbing, advancing, setting, and supporting.

When a plurality of especially identical machines with different functions are to be operated, it will always be necessary to provide not only an extensive supply of energy, for example, hydraulic piping, but also an extensive electrical wiring for transmitting commands to the individual machines, for example, cylinder-piston units. This results for all fields of application in difficulties, and—in particular in mining—in safety problems. This applies in particular to the case, where an operation is automated and consequently requires not only function commands, but also control commands. For this reason, it is suitable to connect in series the electrical control subsystems that are arranged on each actuating element, for example, each valve, and which comprise in this case at least one electromagnet, i.e., by a common cable to the central control system. However, a prerequisite therefor is that the individual function and/or control commands be always sent with a coding, which is identified by the addressed control subsystem, so that only that control subsystem responds, which stores a corresponding coding.

This means that after the mechanical installation of an actuating element, for example, a valve on a certain machine, it will be necessary to store in the respective control subsystem a certain coding, and that the codings of all valves are stored in the central control system such that the function and/or control commands to be sent to the respective valve are transmitted in series only with the associated coding. To this end, it is thus necessary that a programming occur both in the individual control subsystems and in the central control system, which can be performed only by experts, and which requires in complex operations with a plurality of machines and functions a great deal of time, knowledge, and consideration.

BRIEF SUMMARY OF THE PRESENT INVENTION

It is an object of the invention to eliminate at least one of the described operating steps and to thus provide for a safer mounting of the actuating elements, for example, valves on their respective machine, and the association of their control subsystems to the central control system.

The present invention, in one embodiment, provides an electrically controlled actuating apparatus that includes an actuating element having a mounting flange, a machine flange configured to overlie and be interconnected with the mounting flange, a control subsystem for controlling the actuating element, and a plurality of electric switches mounted on the mounting flange in a predetermined geometric pattern, such that each switch is arranged in an electric circuit that connects to the control subsystem. The present invention also includes at least one carrier attached to the machine flange that mounts closing elements in a geometric arrangement that is characteristic of the actuating element and is assigned thereto, such that when the machine flange and the mounting flange are interconnected, the switches can be actuated by the closing elements arranged in the carrier.

It is obvious that one can also reverse the distribution of the switches and closing elements on the mounting flange and machine flange, if this appears to be useful for the association of valve and machine. The electric circuits are applied constantly and in their entirety to a source of voltage, for example, the voltage of a control current supply.

With this solution, a signal characteristic of the actuating element, for example, the valve, is present in the control subunit of each actuating element by closing some geometrically defined and identified switches. This signal is associated as a key or coding to the respective actuating element, and can be compared with any incoming signal. To cause the control subunit of a certain actuating element to execute a function or control command, it is necessary to input along with the command, the code that is associated with the actuating element. In so doing, wrong manipulations are avoided.

In the further developments of the invention, different electric switches and corresponding closing elements are used. In particular, they provide that the combination of switch and closing element permits connecting and disconnecting the respective electric circuit. However, it is likewise possible to influence only the current of the circuit, for example, to use inductive resistors that act as switches, and which are included in the electric circuit. In this case, one uses as closing elements inclusions or recesses, for example, bores in the machine flange, which influence the magnetic field of the coil. When reed contacts are used as switches, the closing elements are made in the form of magnets, which have a highly directional magnetic field to prevent lateral scattering, and which ensure an unambiguous allocation of the closing elements in predetermined positions of the geometric pattern. In particular, they may be pot magnets, in which a central, magnetic, permanent-magnetic core is surrounded by a magnetic insulating layer followed by a magnetically nonconductive pot. Likewise Hall generators are suitable.

When arranging a closing element in a position, it will be necessary to predetermine potentially many positions in the geometric pattern, so that each of the valves can be adequately characterized. The fact that in a predetermined geometric pattern with a plurality of positions, respectively two or more positions are occupied, permits increasing the available number of possible selections of positions to the sum of the number of potential positions. For example, when 8 switches are arranged in the mounting flange and two positions in the machine flange are occupied by closing elements, it will be possible to produce 28 different combinations, and to express them in numbers. Yet, a preferred further development provides for subdividing the geometric pattern into two or more subpatterns, with each subpattern being occupied by one or more positions. When occupying each subpattern with a position, the number of the valves to be characterized will in this case be equal to the product of the potential positions of each subpattern. Thus, when, for example, 8 switches are arranged in each subpattern of the mounting flange, and one position in each subpattern is occupied by closing elements, it will be possible to produce 64 different combinations and to express them in numbers.

A further development, which is advantageous in particular when such machines, for example, hydraulic devices, are assigned only subsequently to a defined function, provides for arranging in the machine flange a carrier, preferably two carriers, which each accommodate a closing element. The carriers are adjustable relative to the flange such that it is possible to place the closing elements in positions of the predetermined geometric pattern, which are to be selected. With that, it is possible to adjust at a later time the coding of such an actuating element, for example, a valve that is to be mounted. Preferably, the carriers are made in the form of rotatable disks, which are arranged in planes near and parallel to the flange plane. Preferably, the rotated position of the disk can be locked by engaging different positions, which each correspond to a point of the geometric pattern. In this case, it is natural to arrange the electric switches in the mounting flange also in a circle, which corresponds to the turning circle of the closing elements. In general, it should be added that the geometric pattern for arranging the switches may be any pattern. For example, it may be a line or a closed circle with a predetermined graduation.

DETAILED DESCRIPTION

Figure 1:
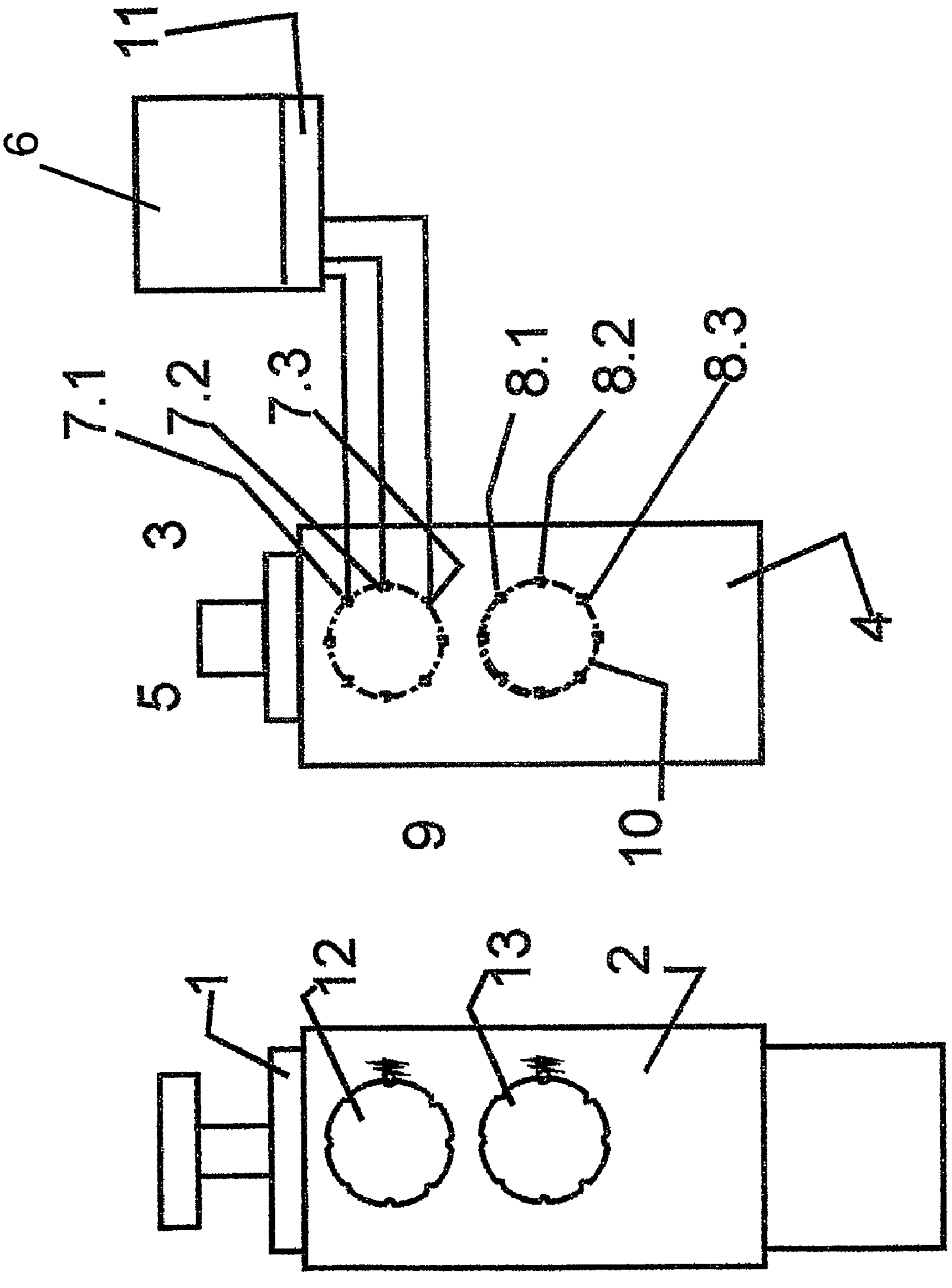
FIG. 1 is a schematic view of an actuating element and a flange connection for a machine.

Illustrated as a machine is a cylinder-piston unit 1, which comprises a machine flange 2. The latter is adapted for receiving as actuating element a magnetically controlled, hydraulic valve 3 with a mounting flange 4. It should be noted that while both flanges are shown in the plane of the drawing, they overlie each other, when flanged together. A magnet 5 of the valve 3 is activated by a control subsystem 6 and the latter by a central control system not shown. Embedded in the mounting flange are switches 7.1-7.8 and 8.1-8.8, namely eight of each arranged respectively along one of the circles 9 and 10. The switches are positioned close to the connecting plane of the flange 4. Each of the switches 7 and 8 is arranged in an electric circuit that connects to the control subsystem. When one of the switches 7.1 et seq. and 8.1 et seq. is closed, the current of the corresponding circuit will be registered in the control subsystem. A memory 11 of the control subsystem stores all possible combinations of the electric circuits with the switches 7.1 et seq. and 8.1 et seq. In a comparison operation, these combinations are compared with an existing combination of closed switches, and the corresponding combination is called up. For each of the combinations a certain code word is stored in the memory. Activated will be that code word, whose combination has been called up. The code word must be input into the control subsystem, when the control subsystem is to execute a certain function command or control command. The code word can be stored, for example, in the central control system, and be automatically transmitted, when a command for this control subsystem or the associated valve is entered via the central control system.

In the connecting plane of the machine flange 2, two disks extend as carriers 12 and 13, which are adapted for rotation in the assembled state in concentric relationship with the circles 9 and 10 respectively of the mounting flange 4, and which can be locked in position by engaging one of eight positions. On each of the disks, in a circle, which is congruent in the assembled state with the circles 9 and 10 of the mounting flange 4, a closing element is arranged in such a manner that it interacts in one of the engaged positions in the assembled state with one of the switches 7.1 et seq. and 8.1 et seq. respectively and closes the particular electric circuit.

It is thus possible to set up and program at a longwall face all cylinder-piston units of a face support framework, and the associated valves, and the associated valve control systems in an identical manner. When assembling the cylinder-piston unit, the disks 12 and 13 adjust a defined position of the closing elements. The combination of this position is characteristic of the location and function of the cylinder-piston unit in the face support framework. The mounting of the valve thus permits closing a characteristic combination of switches 7.1 et seq. and 8.1 et seq. respectively, and thereby assigning in the control subsystem a certain code word to the valve. This code word is also assigned to the valve or this cylinder-piston unit in the central control system. When a certain command is then to be transmitted from the central control system to this cylinder-piston unit, the code word will be automatically called up, and with that the input command signal will be transmitted to the associated control subsystem.

That which is claimed:

1. An electrically controlled actuating apparatus, comprising:

- an actuating element having a mounting flange;
- a machine flange configured to overlie and be interconnected with said mounting flange;
- a control subsystem for controlling said actuating element;
- a plurality of electric switches mounted on said mounting flange in a predetermined geometric pattern, and wherein each switch is arranged in an electric circuit that connects to said control subsystem; and
- at least one carrier attached to said machine flange that mounts closing elements in a geometric arrangement that is characteristic of said actuating element and assigned thereto,
- wherein when said machine flange and said mounting flange are interconnected, the switches can be actuated by said closing elements arranged in said at least one carrier,
- wherein said plurality of electric switches are reed contacts and said closing elements are magnets, wherein all predetermined selections of positions for the predetermined geometric pattern are stored in a central control system and associated with a respective one of the actuating elements,
- wherein the central control system is serially connected to the control subsystems,
- wherein the respective geometric arrangement of said at least one carrier of said plurality of actuating elements derived therefrom is signaled to said central control system and stored;

wherein said actuation commands are transmitted in series from said central control system to said plurality of control subsystems;

wherein a memory of a control subsystem stores respective code words associated with the possible positions; and wherein each of said plurality of control subsystems has the respective arrangement of said at least one carrier of the addressed actuating element derived therefrom, and wherein only the control subsystem that has the transmitted arrangement of positions of said at least one carrier converts the commands for actuating said actuating element associated with the transmitted arrangement of positions by comparing in a comparison operation the transmitted arrangement of positions to the stored positions and calling up the associated code word.

2. The electrically controlled actuating apparatus of claim 1, wherein said closing elements actuate the switches arranged in said at least one carrier by closing the switches.

3. The electrically controlled actuating apparatus of claim 1, wherein the switches can be actuated by said closing elements for changing the current in said electric circuit.

4. The electrically controlled actuating apparatus of claim 1, wherein said plurality of electric switches are permanent magnets with a highly directional magnetic field.

5. The electrically controlled actuating apparatus of claim 1, wherein said geometric pattern is subdivided into a plurality of subpatterns, and said closing elements are arranged respectively in at least one point of each subpattern.

6. The electrically controlled actuating apparatus of claim 1, wherein said control subsystem is equipped with a memory that stores a geometric arrangement of the closing elements that is characteristic of and assigned to said actuating element.

7. The electrically controlled actuating apparatus of claim 1, wherein each predetermined position of the at least one carrier for said predetermined geometric pattern is stored in a central control unit and are associated with one actuating element.

8. An electrically controlled actuating apparatus, comprising:

an actuating element having a mounting flange;

a machine flange configured to overlie and be interconnected with said mounting flange;

a control subsystem for controlling said actuating element;

a plurality of electric switches mounted on said mounting flange in a predetermined geometric pattern, and wherein each switch is arranged in an electric circuit that connects to said control subsystem; and at least one carrier attached to said machine flange that mounts closing elements in a geometric arrangement that is characteristic of said actuating element and assigned thereto, wherein when said machine flange and said mounting flange are interconnected, the switches can be actuated by said closing elements arranged in said at least one carrier, wherein said plurality of electric switches are reed contacts and said closing elements are magnets, wherein all predetermined selections of positions for the predetermined geometric pattern are stored in a central control system and in the memory of each control subsystem, wherein the central control system is serially connected to the control subsystems, wherein the respective geometric arrangement of said at least one carrier of said plurality of actuating elements derived therefrom is signaled to said central control system and stored for being associated with a respective one of the actuating elements and any actuation command addressed thereto, wherein the respective geometric arrangement of said at least one carrier of said plurality of actuating elements derived therefrom is signaled to said the memory of the respective control subsystem for being compared with all predetermined selections of positions for the predetermined geometric pattern and activating the corresponding geometric pattern as the code word associated with the respective actuating element, wherein said actuation commands are transmitted in series from said central control system to said plurality of control subsystems associated with the code word of the respective one of the actuating elements, and wherein all of the control subsystems in a comparison operation compare the transmitted code word to the stored code words in the memory each of the control subsystems, calling up only that control subsystem, the activated code word of which corresponds to the transmitted code word.

* * * * *

UNITED STATES PATENT AND TRADEMARK OFFICE
CERTIFICATE OF CORRECTION

PATENT NO. : 7,659,832 B2
APPLICATION NO. : 11/243384
DATED : February 9, 2010
INVENTOR(S) : Willi Kussel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1163 days.

Signed and Sealed this

Thirtieth Day of November, 2010

David J. Kappos
*Director of the United States Patent and Trademark Office*